United States Patent [19]
Haddock

[11] Patent Number: 5,634,032
[45] Date of Patent: May 27, 1997

[54] DYNAMIC DIGITAL IDENTIFICATION OF STORAGE MEDIA

[76] Inventor: Fred T. Haddock, 3935 Holden Dr., Ann Arbor, Mich. 48103

[21] Appl. No.: 477,555

[22] Filed: Jun. 7, 1995

[51] Int. Cl.⁶ ............................................ G06F 12/00
[52] U.S. Cl. ................................. 395/439; 369/34
[58] Field of Search ........................ 395/427, 439; 369/34; 360/132

[56] References Cited

U.S. PATENT DOCUMENTS

| | | | |
|---|---|---|---|
| 4,001,891 | 1/1977 | Held | 360/132 |
| 4,723,181 | 2/1988 | Hickok | 360/72.2 |
| 4,960,982 | 10/1990 | Takahira | 235/382 |
| 5,025,432 | 6/1991 | Naito | 369/36 |
| 5,357,495 | 10/1994 | Solhjell | 369/34 |
| 5,546,315 | 8/1996 | Kleinschnitz | 364/478.06 |
| 5,546,556 | 8/1996 | Matsushita | 395/427 |

*Primary Examiner*—Tod R. Swann
*Assistant Examiner*—Christopher S. Chow
*Attorney, Agent, or Firm*—Harness, Dickey & Pierce

[57] ABSTRACT

Computerized data information relating to stored file directories, media labels and other relevant information is stored on the media package itself in a memory device separate from the media. The memory device is updated automatically when the media is inserted in a computer during use. A readout coupled to the memory gives a display of the contents of the media without the need to insert the media into the host computer.

8 Claims, 6 Drawing Sheets

DYNAMIC DIGITAL IDENTIFICATION OF STORAGE MEDIA

FIELD OF THE INVENTION

The present invention relates generally to data storage media. More particularly, the invention relates to a storage media system for maintaining and displaying the contents of a removable storage medium without the need to load the medium into a computer system.

BACKGROUND AND SUMMARY OF THE INVENTION

Present-day computer systems have associated storage media for the storage and retrieval of digital data, normally in the form of files and records. In order to maintain convenient access and retrieval of this information predefined identification structures, such as file directories, record indices, subdirectories, media labels and the like, are utilized. In most cases these information structures are stored on the storage media itself in the same manner as any user data is stored on the media. In other words, a removable media such as a floppy diskette has a portion of the media reserved for storage of the directory structure, file structure and the like. The same physical medium is used for storing both the directory information and also any data associated with the files in those directories.

In order to use the conventional identification information stored on the media it is necessary to read this information from the media using an associated host computer system. The computer system, in turn, is responsible for formatting and displaying the information to the user through attached output devices such as CRT monitors and printers. While this is adequate for most purposes, there are times when this system becomes impractical. For example, when searching for a particular file or record located somewhere in a large collection of individual removable media, it takes a great deal of time to load each individual media separately into the host computer, display the directory and file contents, if the desired file is not found, ejecting the media, installing a different media and continuing the process.

Although some users will rely on handwritten or printed gummed labels attached to the media, such labels are inherently difficult to use, since a great deal of discipline is required in keeping the labels up to date. Moreover, in some cases where the storage capacity is large, it becomes impractical to attempt to handwrite or print the entire contents on a single label. This is particularly true, for example, with today's high density magneto-optical (MO) media. Thus, in cases where the gummed paper label is not adequate to provide the user with accurate up to date information on the contents of the media, the only method heretofore available to the user is to actually insert the media into the host computer and access the current information from the media using the capabilities of the host system. This interrupts work activity on the host system and is very slow and inefficient due to the one at a time tedium of the searching process.

SUMMARY OF THE INVENTION

The present invention overcomes the shortcomings of conventional storage media by providing a mechanism which stores the contents of the medium independently of the medium itself and which allows the contents to be displayed without using the host system or its attached monitor or printer peripherals. According to one aspect of the invention an apparatus is provided for displaying the contents of a removable storage medium of the type designed to be removably installed in a host computer for access by the host computer during use. The apparatus comprises a memory device disposed on the storage media having access means for reading and writing which are separate from those of the removable storage media itself. A means coupled to the access means is provided for writing data to the memory device, to indicate the contents of the removable storage media. A readout means separate from the host computer is also provided. A means for coupling to the memory device and to the readout is provided for reading data stored in the memory device and supplying that data to the readout. In this way information indicative of the contents of the removable storage media is displayed without the need to install the removable storage media in the host computer.

In accordance with another aspect of the invention, an apparatus for displaying the contents of the removable storage media is provided which comprises a readout means disposed on the storage media. A memory device is also disposed on the storage media which has an access mechanism for reading and writing. In addition, a means is coupled to the access means for writing data to the memory device and for indicating the contents of the removable storage media. A means is coupled to the memory device and to the readout so that data stored in the memory device may be read and supplied to the readout. In this way information indicative of the contents of the removable storage media is displayed on the readout disposed on the storage media, thereby eliminating the need to install the removable storage media on the host computer.

For a more complete understanding of the invention, its objects and advantages, reference may be had to the following specification and to the accompanying drawings.

BRIEF DESCRIPTION OF THE DRAWINGS

The present invention will become more fully understood from the detailed description given herinbelow and the accompanying drawings which are given by way of illustration only, and thus are not limitative of the present invention, and wherein.

DESCRIPTION OF THE PREFERRED EMBODIMENT

Figure 1:
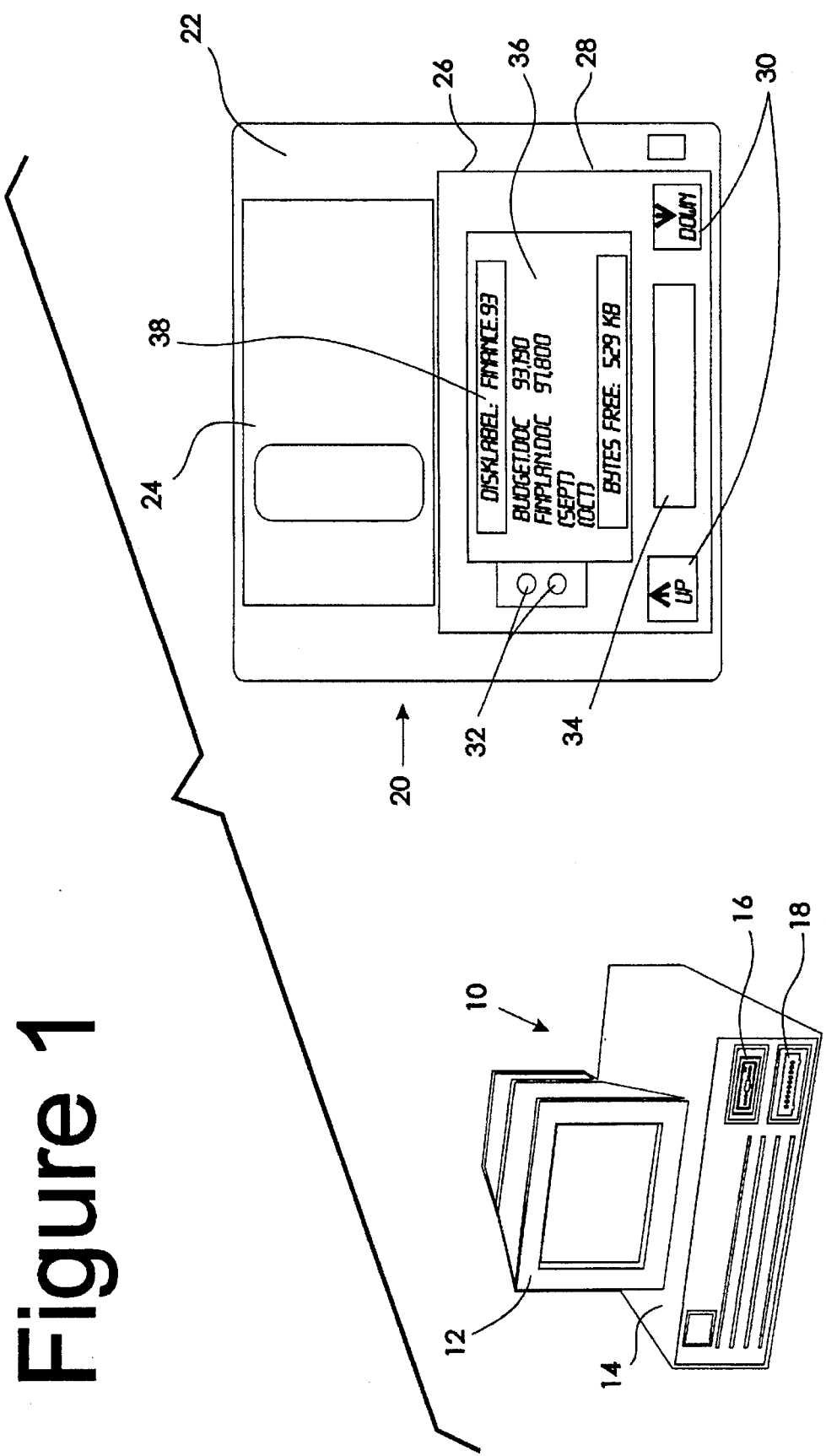
FIG. 1 is an illustration showing the apparatus of the invention in use in a typical host computer system.

Referring to FIG. 1, a host computer system is depicted generally at 10. The host computer may include a CRT monitor 12 and a CPU unit 14. CPU unit 14 includes one or more drives for removable media, such as floppy diskette drive 16 and streaming tape drive 18. Although the floppy diskette drive and the streaming tape drive have been illustrated, it will be understood that the invention can be practiced using virtually any removable media, including magneto-optical media, removable hard drive media, CD-ROMs and the like.

To illustrate the principles of the invention, a floppy diskette 20 has been illustrated. As shown in the enlarged view, floppy diskette 20 includes a case 22 with sliding access door 24 in accordance with conventional practice. In place of the conventional gummed paper label, the display apparatus of the present invention is employed. As illustrated, the display apparatus 26 includes a readout screen 28, which may be implemented using a liquid crystal display device or the like.

As illustrated in FIG. 1 the display apparatus includes two scroll buttons 30 which will scroll the display on the readout up or down in order to allow the user to view the entire file contents listed within the directory of the diskette. Also included is a communication data link, preferably in the form of contacts 32. The data link allows the directory information stored on the diskette to be updated from the host computer system 10, or alternatively from any other compatible computer system.

Power to the display apparatus 26 can be derived from a variety of sources, such as a solar cell 34, or a battery or other suitable power sources. Preferably the readout screen 28 is of a sufficient size to allow display of at least part of a file directory structure, as has been illustrated generally at 36. This display structure can include individual file names, file sizes, creation dates and the like. The display apparatus 26 can also display the diskette label information, as at 38. The diskette label information generally comprises a string of alphanumeric characters used to generally describe the contents of the diskette.

Figure 2:
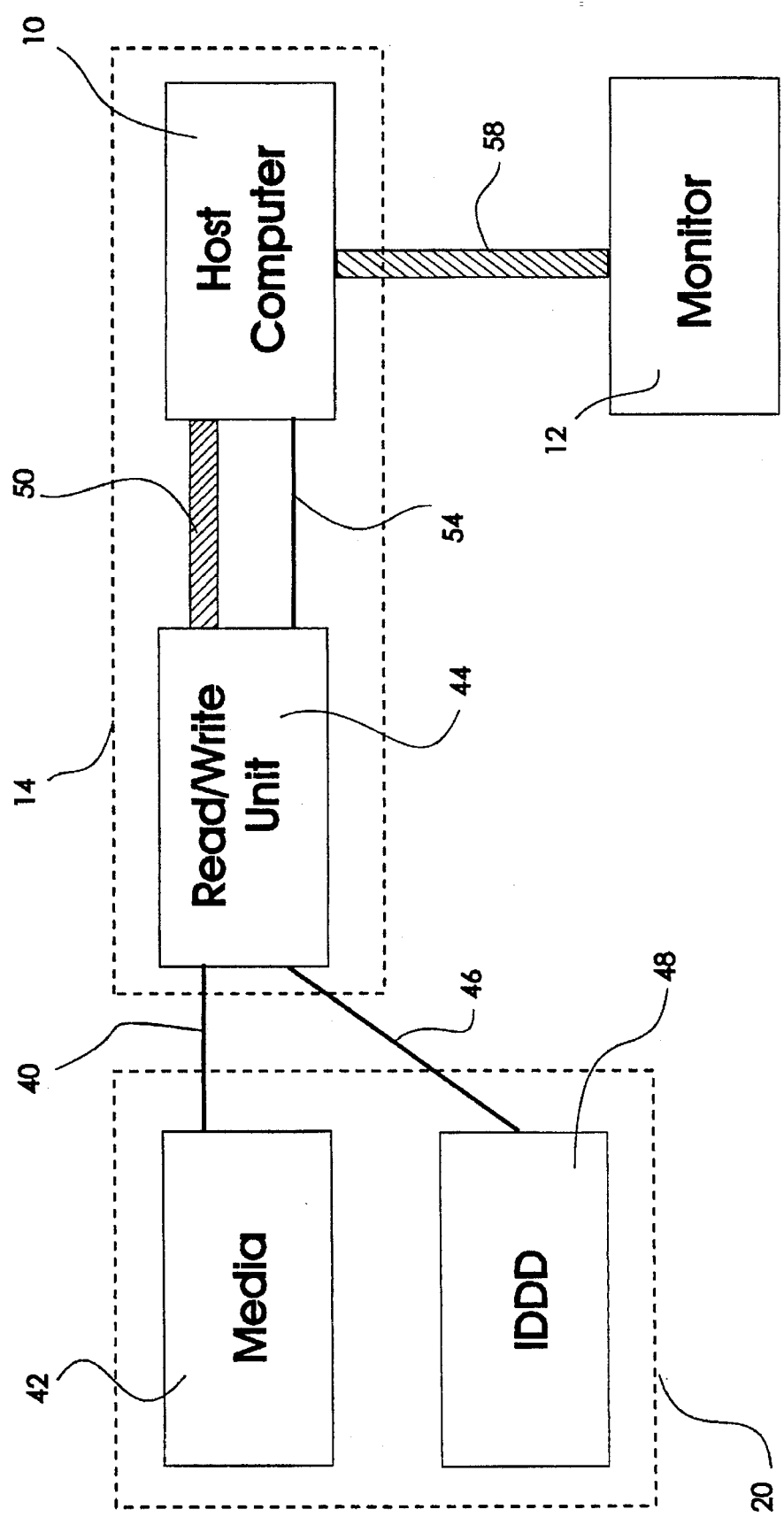
FIG. 2 is a data flow block diagram useful in understanding the invention.

FIG. 2 shows the data flow block diagram of the invention. In FIG. 2, the CPU unit 14 and monitor 12 have been depicted diagrammatically together with the diskette 20. It will, of course, be understood that the invention is applicable to storage media of all types and is therefore not limited to a diskette media. In order to more fully explain the configuration of the invention, CPU unit 14 is illustrated to include read/write unit 44 which is coupled through the data bus 50 to the host computer CPU 10. Host computer CPU 10 is suitably coupled to monitor 12, through video connection link 58.

The diskette 20 includes the usual data storage media 42 which communicates through the transducer connection 40 to read/write unit 44. It is over this transducer connection that data is written to and read from media 42.

In accordance with the invention, diskette 20 further includes an internal directory display device (IDDD) module 48 which communicates over data link connection 46 to read/write unit 44. This data link connection preferably communicates through the data link contacts 32 illustrated in FIG. 1. Thus the data link connection may be seen as a data path, separate from that of the transducer connection 40. Read/write unit 44 is suitably configured to provide terminals which make contact with contacts 32 to establish the data link connection. Although physical contacts have been illustrated, it will be understood that the principles of the invention can be implemented using non-contact data communications techniques, such as infrared transmitter/receiver units. The transducer connection 40 may be conventionally configured to allow the read/write unit 44 to work with media which do not incorporate the features of the invention. In this regard, transducer connection 40 may be the read/write head of a diskette drive. In FIG. 2, a separate data communication link 54 has been illustrated. This connection link is used to convey information from data link connection 46 to host computer 52. Although a separate data communication link 54 has been illustrated, in practice, the data bus 50 may be used for this purpose.

Figure 3A:
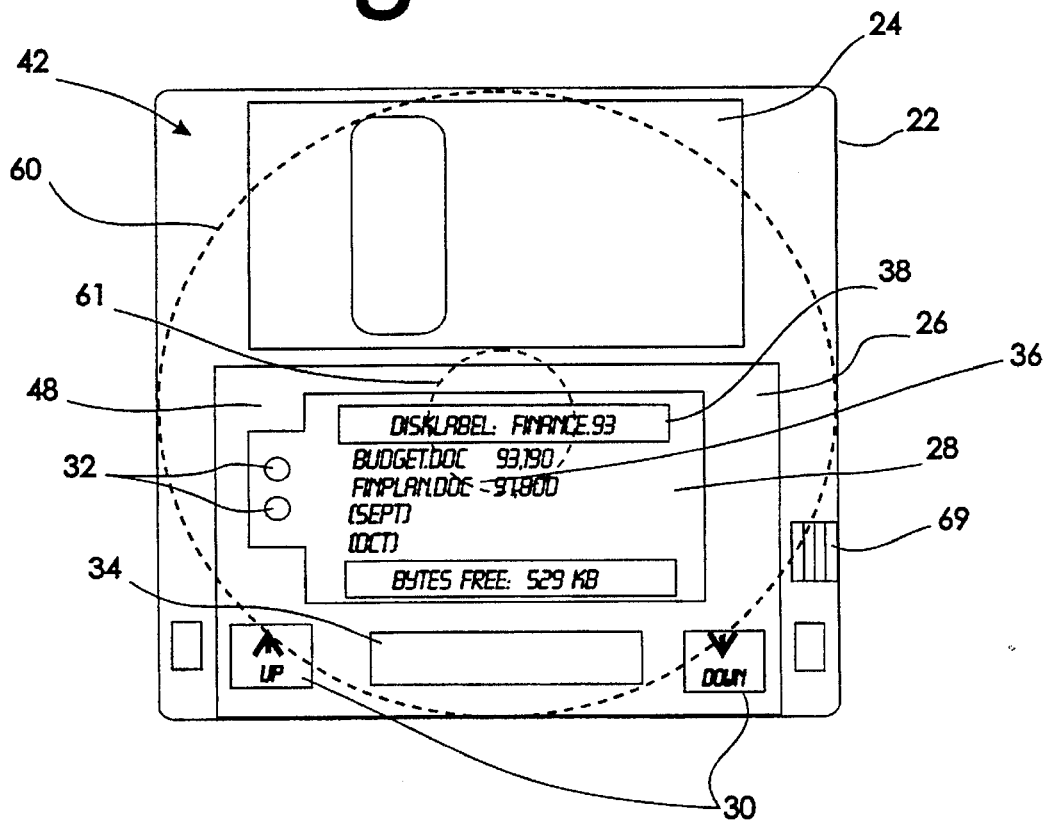
FIG. 3A is a plan view of a first embodiment of the invention.
Figure 3B:
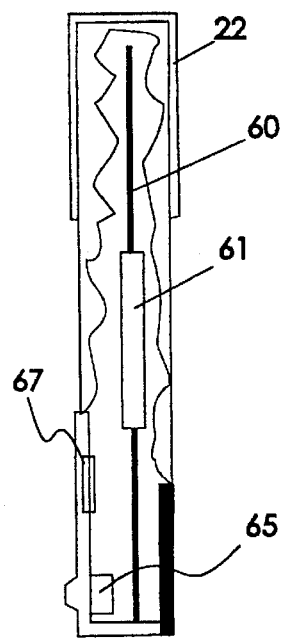
FIG. 3B is a side view of the embodiment of FIG. 3A.
Figure 3C:
FIG. 3C is an end view of the embodiment of FIG. 3A.

Referring to FIGS. 3A, 3B and 3C, the presently preferred media diskette is illustrated. Case 22 houses media 42 and also houses the IDDD module 48 as shown in FIG. 2. In the illustrated embodiment, media 42 is in the form of a flexible, circular disk 60 supported on a central hub 61. The IDDD module 48 is preferably fabricated to integrally include the readout screen 28 the scroll buttons 30 and contacts 32. Preferably, the IDDD unit extends across a portion of the face of the diskette (see FIG. 3A) and wraps around the edge (see FIGS. 3B and 3C). If desired, the edge portion can be provided with a readout screen 38 capable of displaying at least a single row of text, as shown in FIG. 3C. As seen in the cut away view of the FIG. 3B, the electronic random access memory chip 65 used to independently store the directory and diskette label information may be positioned in the corner of the case 22 where it will not physically interact or interfere with the rotation of the disk 60. In this regard, the memory device may be in the form of a surface-mounted, nonvolatile random access memory device 65. While the invention is capable of being powered using a solar cell, a battery may also be provided, such as battery 67. The battery can be accessed through a sliding access door 69 (FIG. 3A).

Figure 4:
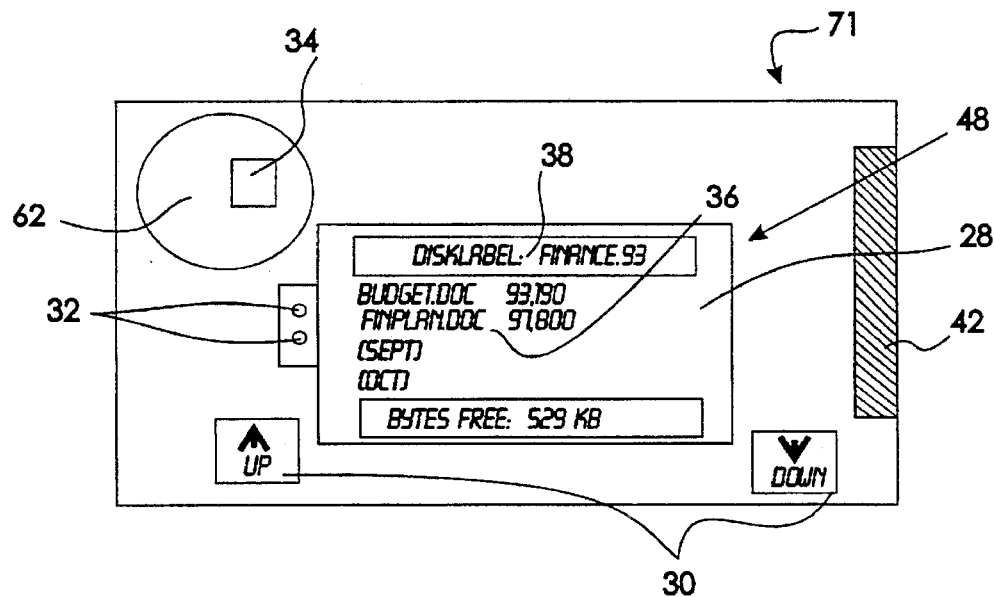
FIG. 4 is a plan view of a memory card used in implementing the present invention.
Figure 5:
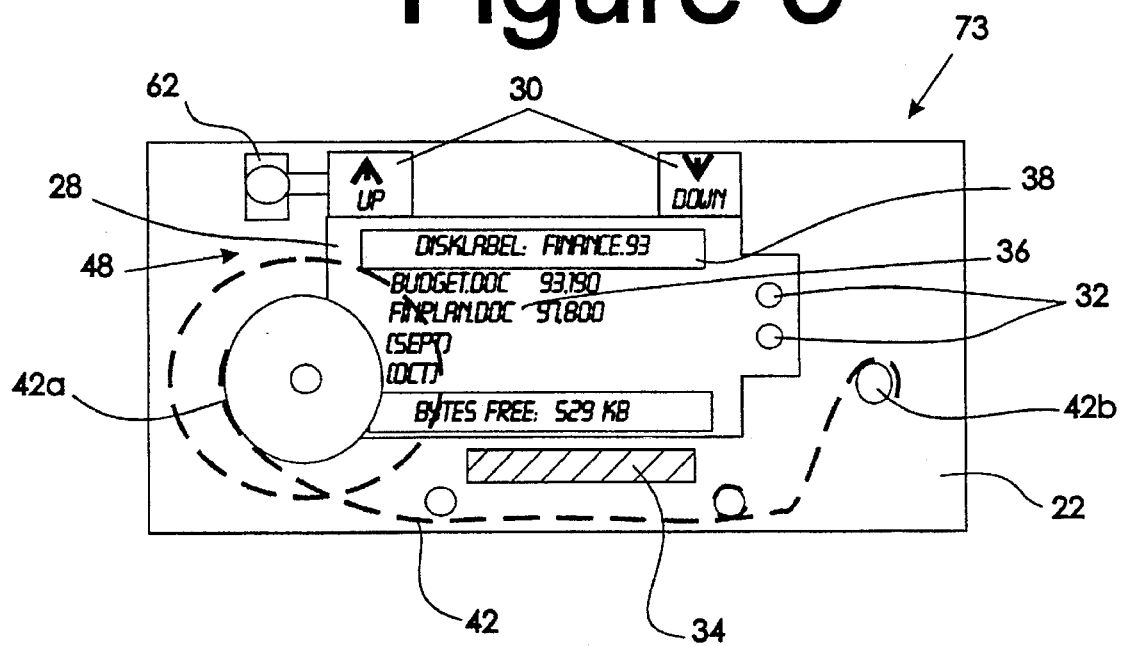
FIG. 5 illustrates the invention in use in conjunction with a streaming tape data cartridge.

FIGS. 4 and 5 show the invention in use in conjunction with a solid-state memory card 71 (FIG. 4) and tape cassette 73 (FIG. 5). Although the physical layout of the various components may differ with different storage media, the basic components are the same as those illustrated and described in connection with FIGS. 1–3.

Referring to FIG. 4, the memory card 71 is illustrated. Memory card 71 houses media strip 42 and also houses the IDDD module 48. In the illustrated embodiment, media strip 42 is in the form of a magnetic strip disposed along an edge of the card 71, however it is noted that the memory card 71 can also be utilized having an IC chip or any other known media storage arrangement commonly used on a memory card. The IDDD module 48 is preferably fabricated to integrally include the readout screen 28 the scroll buttons 30 and contacts 32. Preferably, the IDDD unit extends across a portion of the face of the memory card 71. The electronic random access memory 62 used to independently store the directory and diskette label information may be positioned on the edge of the card 71 where it will not physically interact or interfere with the reading of the magnetic strip 42 or other main storage medium. While the IDDD module 48 is capable of being powered using a battery, a solar cell may also be provided, such as solar cell 34.

Referring to FIG. 5, the streaming tape cassette 73 is illustrated. Tape case 22 houses media strip 42 and also houses the IDDD module 48. In the illustrated embodiment, media strip 42 is in the form of a magnetic tape 42 disposed between two reels 42a and 42b. The IDDD module 48 is preferably fabricated to integrally include the readout screen 28 the scroll buttons 30 and contacts 32. Preferably, the IDDD module 48 extends across a portion of the face of the case 22. The electronic random access memory 62 used to independently store the directory and diskette label information may be positioned on the corner of the case 22 where it will not physically interact or interfere with the reading of the magnetic strip 42. While the IDDD module 48 is capable of being powered using a battery, a solar cell may also be provided, such as solar cell 34.

Figure 6B:
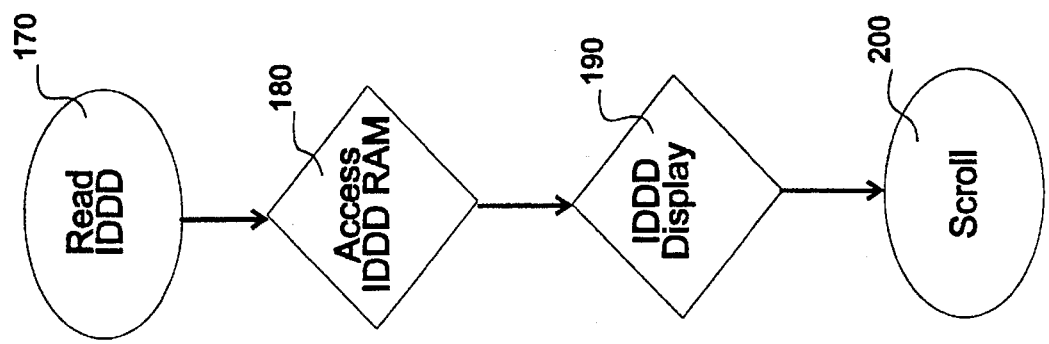
FIGS. 6a and 6b are flowchart diagrams useful in describing the use and function of the present invention.
Figure 6A:
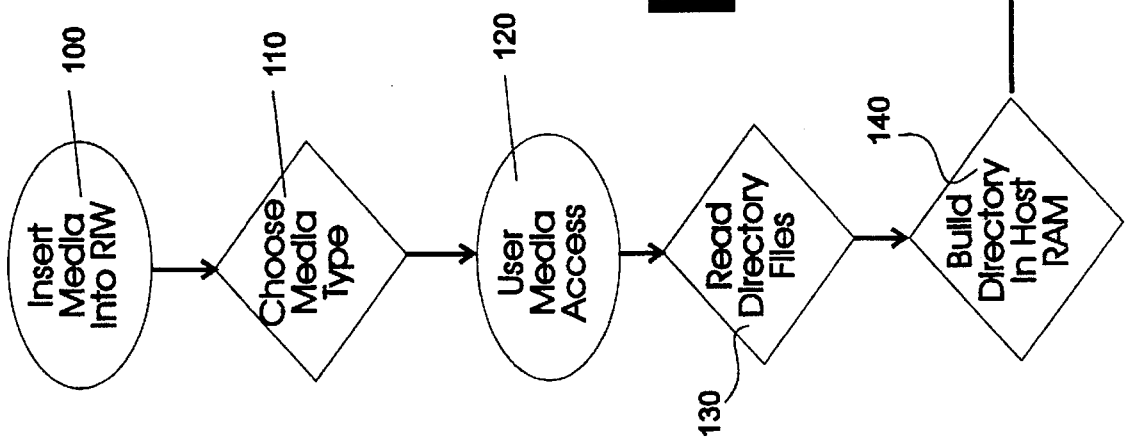

Referring now to FIGS. 6A and 6B, a logic flow diagram of the present system is depicted. In FIGS. 6A and 6B, the oval-shaped steps indicate user interaction. Diamond-shaped steps indicate system action. Thus beginning at step 100, the user inserts the media into the read/write unit 44 of the computer system 10. Next in step 110 the system automatically detects the media loading and automatically performs a check to ensure that a valid media type has been inserted. At this point the IDDD module remains inactive. Next at step 120, when the user accesses the media, by appropriate operation of the computer system, the system automatically reads the directory files in step 130 and this information is used in step 140 to build a directory in the host computer system's random access memory. This action will occur, for example, when any file access or listing of the diskette directory is performed.

Once the directory information has been read and stored in RAM on the host computer system, it is available to be sent to the IDDD module upon the user's request. Thus at step 150, the user can request the information to be updated, whereupon at step 160 the directory information is read from the host computer RAM and written to the memory device on board the IDDD module. In order to access the IDDD module, to confirm the directory status, the user can request a directory read at step 170 using any of the associated scroll buttons 30 on the front panel of the cartridge or case 22. The read IDDD request causes the system to access the IDDD RAM at step 180 and to display the stored contents at step 190. If the required information does not fall within the available display space on the readout screen, the additional information can be accessed by use of the scroll buttons 30 to move the display up and down through the directory listing. This is indicated at step 200.

Figure 7:
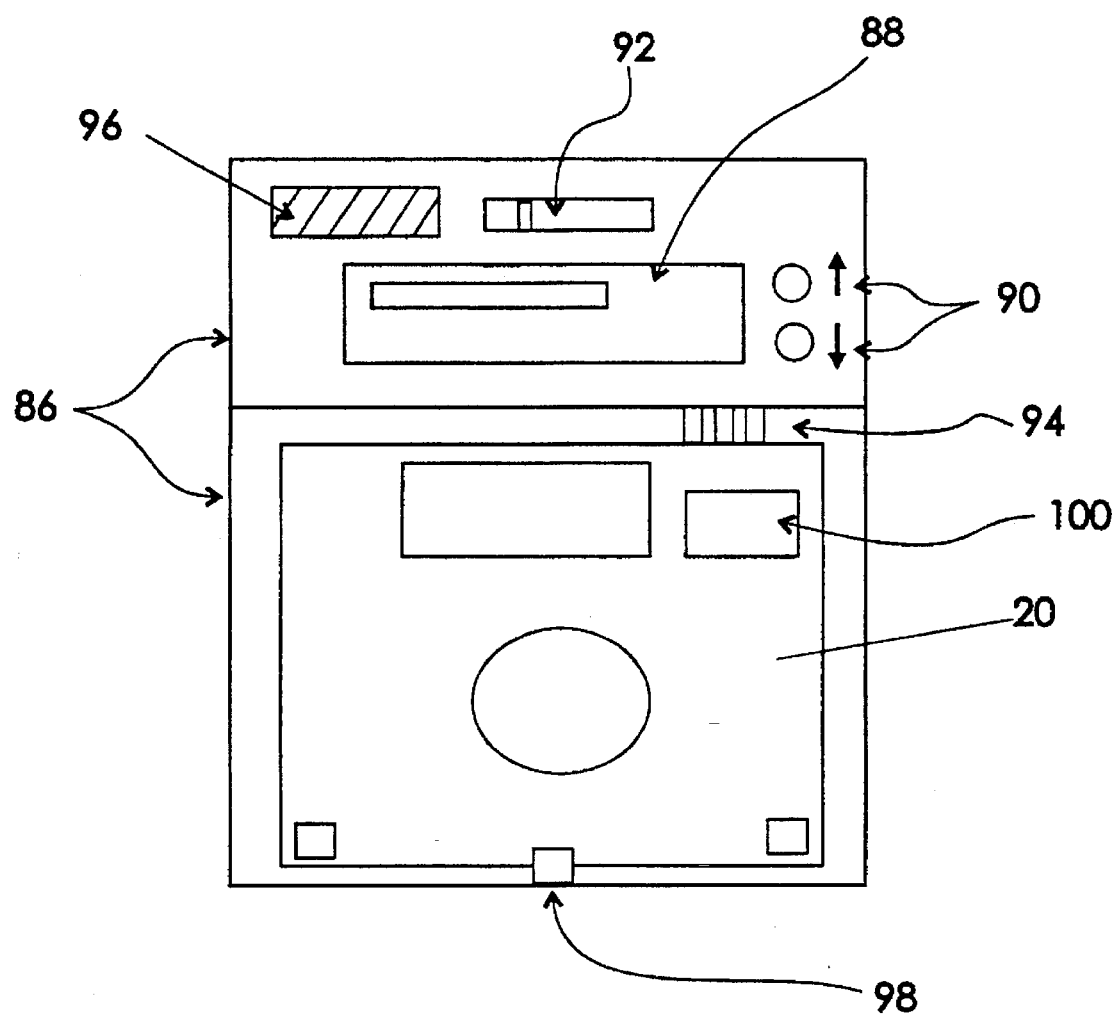
FIG. 7 illustrates an auxiliary device to display the directory of a diskette that does not have its own built-in display.

FIG. 7 illustrates an auxiliary device 86 to display the directory of a diskette that does not have its own built-in display. In other words, the device in FIG. 7 is an auxiliary display module 86 for diskettes. The unit 86 makes it possible to eliminate the built-in display unit on floppies or other storage media that have a chip for containing their directories and operating systems for displaying and using the directory. FIG. 7 illustrates a floppy disk 20 inserted in a recessed region on the module 86 with a snap-latch 98 to hold it in place and secure electrical contact 94 built into the floppy 20 to connect the module display 88 with the chip memory device 100 that contains the directory and other operating software. Once the floppy 20 is mounted in the module 86 then the power supply 96, which can be a solar cell, battery or external supply, can be controlled by the on-off switch 92 to give power to the display unit 88. The display shows the part of the directory which can be scrolled up and down by up-and-down buttons 90. The display may give the file name, the file size in bytes, and the date of last modification, as well as other desirable information.

From the foregoing, it will be seen that the present invention provides an apparatus for displaying the contents of a media which employs a memory device separate from that of the media itself whereby information such as directory listings and file contents can be stored for display on a readout separate from that of the host computer. The system is capable of being used on a wide variety of different types of data storage media. Therefore, while the invention has been illustrated and described in conjunction with certain types of media, it will be understood that the principles of the invention can be adapted to virtually any storage medium. Accordingly, it should be understood that the present invention is capable of certain modification and change without departing from the spirit of the invention as set forth in the appended claims.

What is claimed is:

1. In a removable storage device of a type designed to be removably installed in a host computer for access by the host computer during use, the improvement comprising:

a storage medium for storage of digital information thereon disposed within said removable storage device;

a readout means disposed on said storage device, said readout means and said storage medium being inseparable from one another by virtue of each being disposed on said removable storage device;

a memory device disposed on said storage device having access means for reading and writing, said memory device and said storage medium being inseparable from one another by virtue of both being disposed on said removable storage device;

means coupled to said access means for writing data to said memory device for indicating the contents of said storage medium;

means coupled to said memory device and to said readout means for reading data stored in said memory device and supplying said data to said readout means, whereby information indicative of the contents of said storage medium is displayed without the need to install the removable storage device in said host computer.

2. The apparatus of claim 1 further comprising means for supplying electrical energy to said readout means.

3. The apparatus of claim 1 further comprising means for causing said information indicative of the contents of said storage medium to be supplied by said host computer when said removable storage device is installed in said host computer.

4. The apparatus of claim 3 wherein said means for causing said information indicative of the contents of said storage medium to be supplied by said host computer comprises serial communicating means coupled to said memory means and having terminals for making contact with said host computer when said storage device is installed in said host computer.

5. The apparatus of claim 1 further comprising scrolling means disposed on said removable storage device for manually selecting a portion of said information indicative of the contents of said storage medium to be displayed.

6. The apparatus of claim 1 further comprising means for generating image data for writing to said memory means in a form for direct display on said readout means.

7. The apparatus of claim 6 wherein said image data is pixel data.

8. The apparatus of claim 6 wherein said means for generating image data comprises software means under control of said host computer.

* * * * *